United States Patent [19]

Shea et al.

[11] 4,265,338
[45] May 5, 1981

[54] WHEEL AND GROUND ENGAGING EMERGENCY BRAKE

[76] Inventors: Andrew S. Shea; Frances Shea, both of 171 N. Diamond St., Mount Pleasant, Pa. 15666

[21] Appl. No.: 5,902

[22] Filed: Jan. 23, 1979

[51] Int. Cl.³ .......................... B60T 1/04; B60T 1/14
[52] U.S. Cl. ................................................. 188/4 R
[58] Field of Search .......................... 188/4 R, 4 B, 29

[56] References Cited

U.S. PATENT DOCUMENTS

| | | | |
|---|---|---|---|
| 808,234 | 12/1905 | Gooch | 188/4 R |
| 2,252,878 | 8/1941 | Bella et al. | 188/4 R |
| 2,562,521 | 7/1952 | Blattner | 188/4 R |
| 2,780,322 | 2/1957 | Hickle | 188/29 |
| 3,042,150 | 7/1962 | Lukawsky | 188/4 R |
| 3,078,963 | 2/1963 | Shea | 188/4 R |
| 3,086,619 | 4/1963 | Grotz | 188/4 R |

FOREIGN PATENT DOCUMENTS 825491 12/1951 Fed. Rep. of Germany .......... 188/4 R

*Primary Examiner*—George E. A. Halvosa
*Attorney, Agent, or Firm*—Harvey B. Jacobson

[57] ABSTRACT

The emergency brake comprises an elongated flexible skid member which is held within a tray-like support member above the wheels of a vehicle upon which it is used. During an emergency situation, the tray is dropped to a position proximate the vehicle wheels and a free end of the skid is fed out of the tray under the power of an electric motor which is engaged with the skid. The skid then becomes entrapped between a wheel and its support surface. A stop member on the skid abuts a cooperating stop member on the support tray at which time further advance of the skid from the tray is halted. Hardened steel tips are included on the skid pointing in a direction away from the vehicle wheel and into the support surface of the vehicle wheel. These hardened steel tips dig into the support surface and, together with the cooperating stop elements, cause cessation of the forward movement of the vehicle. The vehicle may be backed off the skid, whereupon the motor may be activated in reverse to reintroduce the elongated skid into the support tray.

6 Claims, 8 Drawing Figures

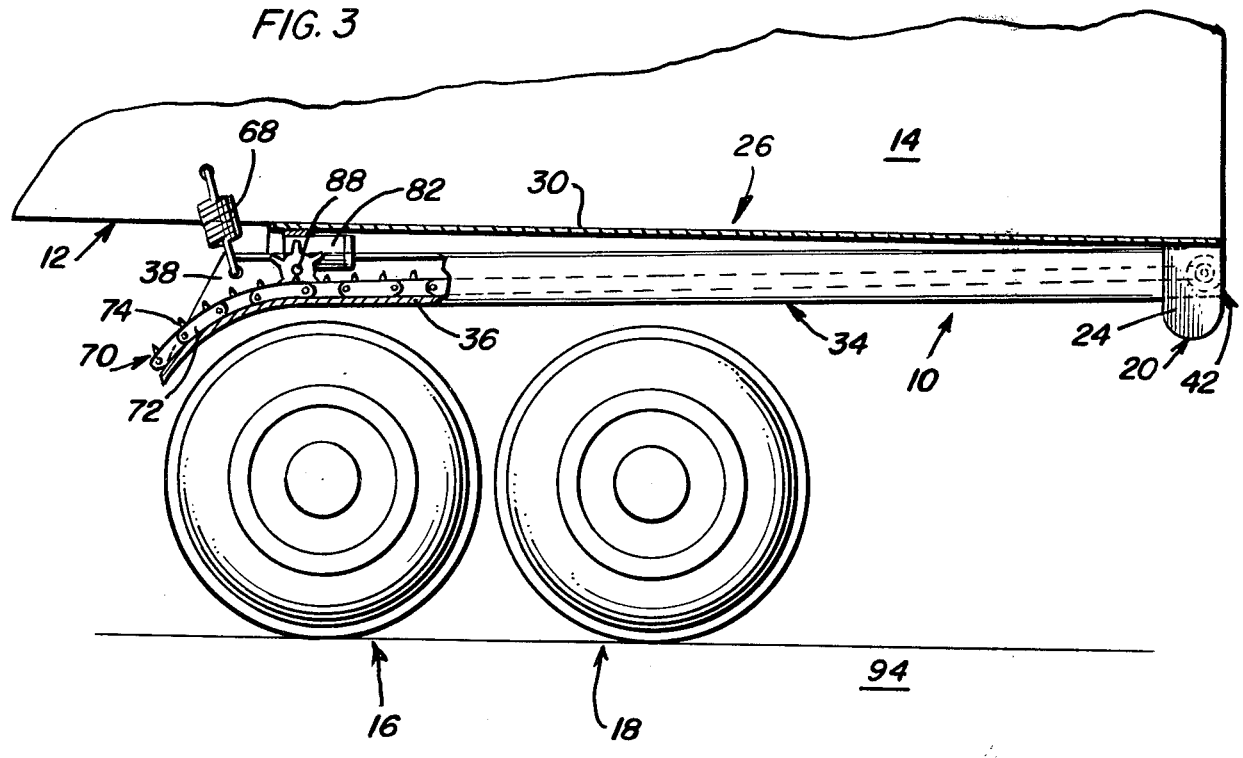
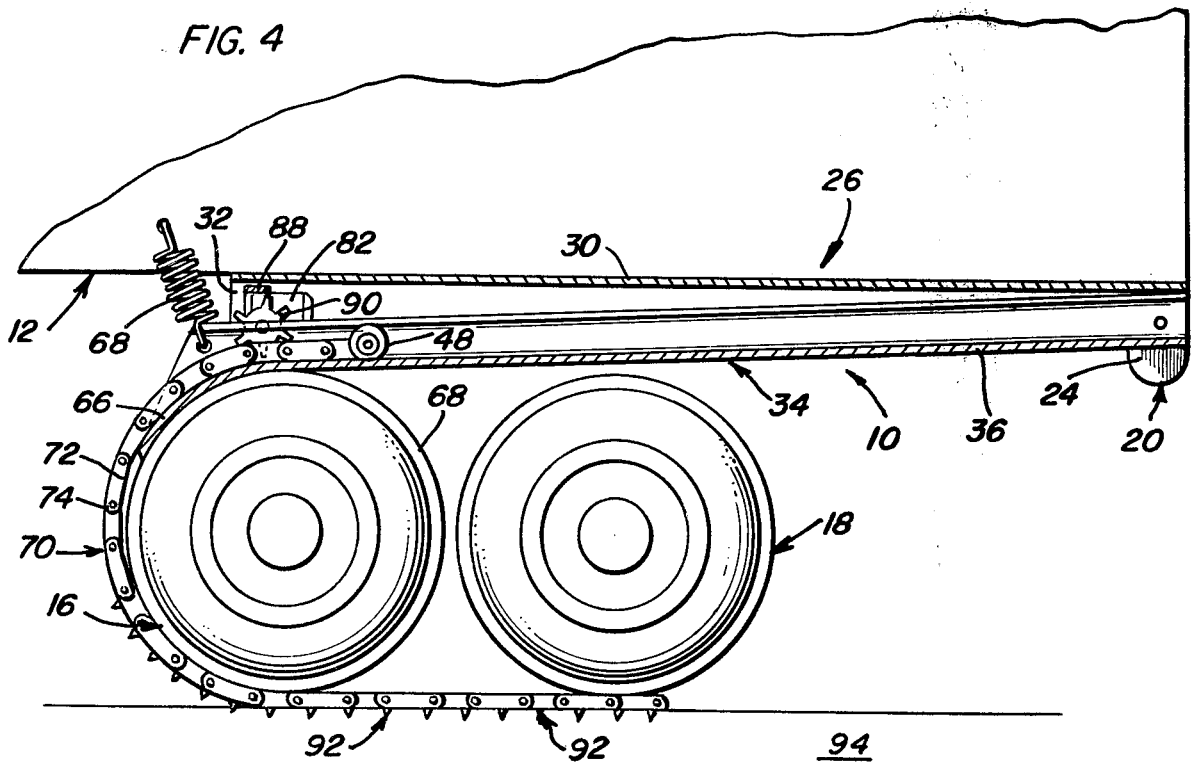

WHEEL AND GROUND ENGAGING EMERGENCY BRAKE

BACKGROUND OF THE INVENTION

1. Field of the Invention

This invention relates to improvements in emergency brakes and more specifically to improvement in emergency brakes of the skid type including an elongated flexible skid member which may be held in a retracted position or moved into an extended position beneath a vehicle wheel by means of a motorized control mechanism to effect emergency braking of a vehicle.

2. Description of the Prior Art

Various types of emergency brake mechanisms for vehicles have heretofore been designed and used with varying degrees of success. Some of these emergency brakes are provided for engagement with various portions of the drive train of a vehicle and are most ineffective unless there is a failure of the drive train between the emergency brake mechanism and the support wheels of the vehicle. If such a failure does occur, the support wheels of the vehicle are then free wheeling and incapable of stopping forward movement of the vehicle.

Accordingly, certain emergency brake assemblies have been proposed which rely solely upon the rolling contact of one of more of the vehicle wheels with the supporting surface. Such emergency brakes include that shown in U.S. Pat. No. 3,078,963, issued Feb. 26, 1963 to Shea. The Shea patent shows an elongated flexible skid member which is maintained in a support tray which is disposed above a vehicle wheel. Upon actuation, the tray drops down upon the wheel and vibratory motion created by the wheel together with the force of gravity causes the skid to slide to a position beneath the wheel. Such a mechanism may be less than desirable in that the force of gravity constitutes the major means of causing initial movement of the skid. If the emergency brake has not been used for long periods of time, the skid may become stuck within its support tray and thus causing the emergency brake to be ineffective. Also, the vibrating motion created by engagement of the support tray with the wheel may cause undesirable side effects such as damage to the skid at the point of contact with the vehicle wheel.

Other emergency brake devices include U.S. Pat. Nos. 2,887,185, issued May 19, 1959 to Lee, 2,868,333, issued Jan. 13, 1959 to Willison, 2,818,939, issued Jan. 7, 1958 to Benn, 2,806,556, issued Sept. 17, 1957 to Norris, and 2,746,570, issued May 22, 1956 to Stahmer. Each of these devices, however, also relies upon the force of gravity for actuation thereof and in that respect, has some of the inherent deficiencies of the Shea patent.

SUMMARY OF THE INVENTION

The present invention includes a support tray which is pivotally attached at one point to a vehicle body or frame. The opposite end of the support tray is held above the vehicle wheels by means of a pair of solenoid supports. Upon actuation of the solenoid supports, the tray is allowed to pivot downwardly and is held above the vehicle wheels by a pair of support springs. An elongated flexible skid is slidingly disposed within the tray and engages with a motor actuated gear which, when operative, may move the skid longitudinally along the tray. A first switch located within the cab is operative to release the solenoids and allow the tray to fall. A second switch, also located within the cab, may energize the motor to move the skid along the tray and thus expose a free end of the skid which moves downwardly alongside the vehicle wheels and becomes entrapped between a vehicle wheel and its support surface thus causing the vehicle to come to a sudden stop. Once the vehicle has stopped, it may be backed off the skid and the skid may be returned to the support tray by reverse energization of the motor and the gear drive.

Accordingly, one object of the present invention is to provide an emergency brake for motor vehicles which includes a positive actuation system to insure operation of the emergency brake device even after it has remained inactive over a great length of time.

A further object of the present invention is to provide an emergency brake which may be used on a variety of motor vehicles, including trucks, buses, automobiles, etc.

A still further object of the present invention is to provide an emergency brake for vehicles which includes an elongated flexible skid element which is retained within a support tray and which includes a plurality of hardened spikes for engaging the support surface upon which the vehicle rides, thus enhancing the frictional engagement which ultimately stops the vehicle.

Yet a still further object of the present invention is to provide an emergency brake for vehicles wherein the aforementioned support tray is pivotally mounted upon the vehicle body and has a free end which is engaged with the vehicle body through attachment to a pair of solenoid elements which serve to maintain the support tray in a position spaced above the vehicle wheels.

Another object of the present invention is to provide an emergency brake for vehicles wherein the aforementioned support tray may be released by the solenoids whereupon it may pivot to a position proximate to but slightly spaced from the vehicle wheels and will be held in that position by a pair of support springs which insure that no engagement between a support tray and wheels will occur until the skid element has been released.

These, together with other objects and advantages which will become subsequently apparent, reside in the details of construction and operation as more fully hereinafter described and claimed, reference being had to the accompaying drawings forming a part hereof, wherein like numerals refer to like parts throughout.

BRIEF DESCRIPTION OF THE DRAWINGS

FIG. 3 is a side elevational, part sectional view of the emergency brake with the skid disposed within the support tray.

FIG. 4 is a side elevational, part sectional view of the emergency brake with the skid disposed in its operative position.

DESCRIPTION OF THE PREFERRED EMBODIMENT

Figure 1:
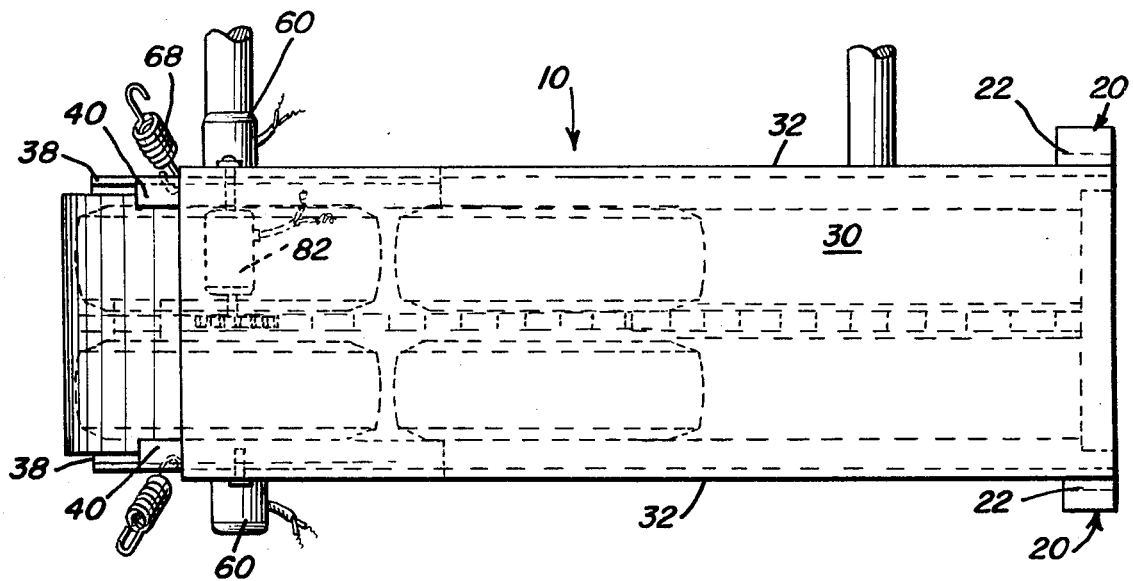
FIG. 1 is a plan view of the emergency brake of the present invention with the skid element disposed within its support tray.

Now with reference to the drawings, the emergency brake, generally referred to by the numeral 10, will be described in detail. With specific reference to FIGS. 1-4, it will be seen that the emergency brake 10 is utilized upon a vehicle 12 which may be any wheeled vehicle such as a tractor trailer, bus, automobile, or the like. The emergency brake is normally attached to the vehicle body 14 at a position above the drive wheels, tandem wheels 16 and 18 or the like.

The emergency brake assembly 10 includes a pair of rear inverted L brackets generally referred to by the numeral 20. The brackets 20 each include a horizontal leg 22 and a vertical leg 24, and it will be noted that each of the horizontal legs 22 is fixedly secured to the body 14 in any convenient manner. A cover plate generally referred to by the reference numeral 26 is also secured to the body 14 in any convenient manner. The cover plate includes an upper wall 30 and a pair of opposite side depending flanges 32. The cover 26 is disposed between the mounting brackets 20 and the outside surface of the depending flanges 32 are disposed in surface-to-surface contact relation to the inner surfaces of the vertical legs 24.

A support tray generally referred to by the reference numeral 34 is provided and includes a bottom wall 36 and a pair of upwardly directed side flanges 38 which each terminate at their upper ends in an inturned flange 40.

With attention now directed to FIGS. 1, 3, 4 and 6, it will be noted that each of the vertical legs 24 has a pivot joint generally referred to by the reference numeral 42 attached thereto. Each of the pivot joints 42 includes a pivot shaft 44 which is fixedly attached to the vertical leg 24 and extends inwardly through a bore 46 formed in the side flange 38 of the support tray 34. Each pivot joint also includes a bushing 48 which is disposed upon shaft 44 to inhibit lateral movement of the support tray 34. With the connection as described, the support tray is allowed to have vertical pivotal motion around the shaft 44.

Figure 2:
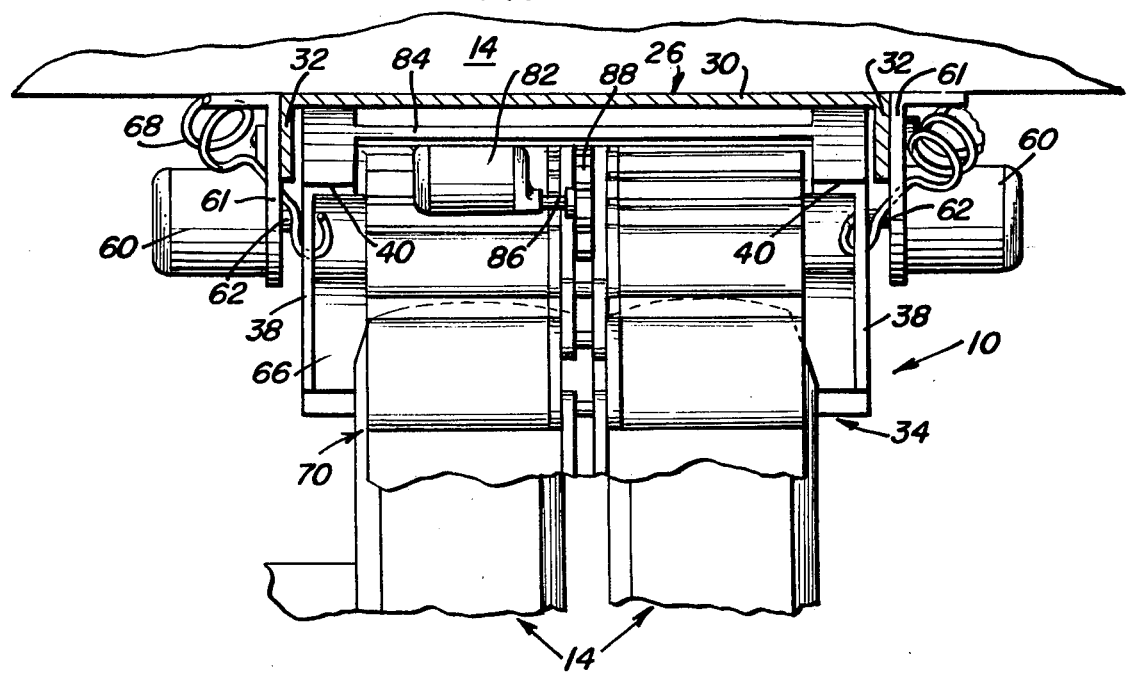
FIG. 2 is a front elevational view of the emergency brake with portion of the skid broken away for clarity.
Figure 5:
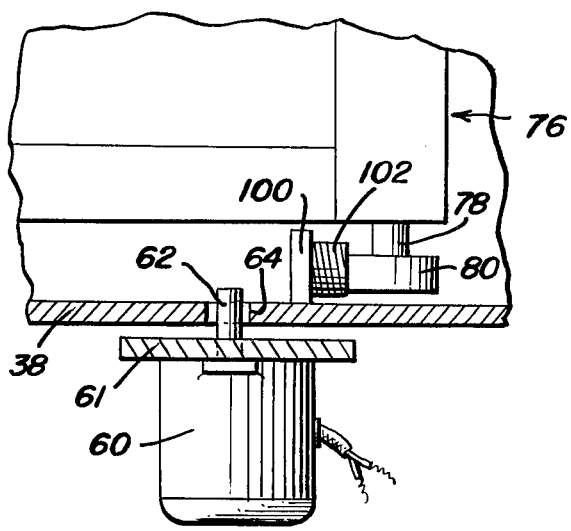
FIG. 5 is an enlarged fragmental sectional view of one solenoid support and one stop mechanism of the emergency brake.

Also, it will be noted that a pair of solenoids generally referred to by the reference numeral 60 as seen in FIGS. 1, 2 and 5, are carried by front mounting brackets 61 which are secured to the body 14 and the outer surfaces of the forward ends of the depending flanges 32. Each of the solenoids 60 includes an armature shaft 62 and each of the side flanges 38 is provided with a bore 64 which is registrable with the inner end of the corresponding armature shaft 62. Accordingly, it may be observed that the support tray 34 has its rear end pivotally secured to the mounting bracket 20 for movement about a horizontally disposed axis extending transversely of the vehicle 12 and that the forward end of the support tray may be swung from an upper horizontally disposed inoperative position to a forwardly and downwardly inclined operative position with the forward end of the bottom wall 36, which has a curved forward end portion 66, held just slightly above the tread surface of wheel 16 by springs 68 which have their ends attached respectively to the vehicle body 14 and the side flanges 32 of support tray 34. In this manner, the support tray may be dropped to an operative position proximate to but spaced from the wheels of the vehicle in preparation for the extension of skid 70 therefrom.

Figure 6:
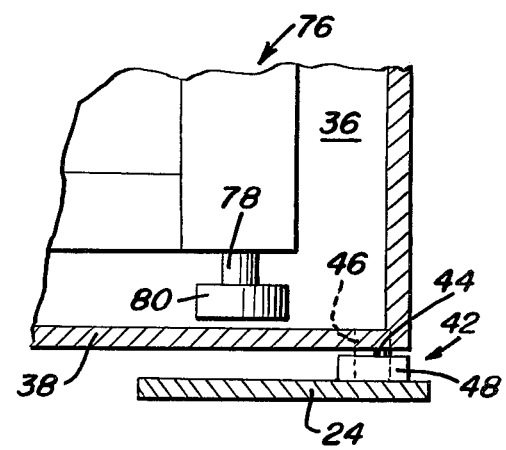
FIG. 6 is an enlarged fragmental view showing the hinge connection of the support tray.

Skid 70 comprises an elongated and flexible skid member which includes a plurality of link sections 72 which are pivotally secured by means of pivot shafts 74 in longitudinally spaced and transversely staggered relation. A retaining bar generally referred to by the reference numeral 76, as seen in FIGS. 5 and 6, is carried by the rear end of the elongated flexible skid member 70 and a shaft 78 extends through the retaining bar 76 and is provided with a roller 80 on each of its opposite ends. Each of the rollers 80 is disposed in rolling contacting relation with the upper surface of the bottom wall 36.

Again with reference to FIGS. 1-4, it will be seen that an electric motor 82 is connected by a bracket 84 to the side flanges 38 of support tray 34 and thus the motor 82 is held in a surmounting position over the skid 70. The motor 82 has a shaft 86 which has mounted thereto a gear 88. Gear 88 includes gear teeth 90 which are spaced to fit between adjacent pivot shafts 74 on the skid 70. Of course, if desired, a separate track may be established for connection with the gear teeth 90. Motor 82 may be designed with a high moment of inertia or may include a mechanical brake such that when the motor is not energized it acts to prevent the extension of skid 70 from support tray 34. When energized, the motor and gear combination is effective to feed out the skid 70 from support tray 34. As the skid 70 is entrapped between wheels 16 and 18 and the ground surface, the tray is pulled downwardly against the force of spring 68 and rests upon the tread surface of wheel 16.

It will be also noted that extensions or spike 92 are included on the skid 70 for engagement with the support surface 94. These spikes may be made of a high carbon steel material to reduce sliding of the skid along the support surface. Once the skid 70 makes contact with the support surface and becomes wedged beneath the wheels of the vehicle, the force of the moving vehicle will pull the free end of the skid in cooperation with motor 82. With reference to FIG. 5 of the drawings, it will be seen that each side of the support tray 34 is provided with an inwardly directed abutment flange 100 and that a compression spring 102 is secured to the rear surface of each abutment flange 100. Thus, it is clear that upon forward movement of the elongated flexible skid member 70, the rollers 80 will be moved into engagement with the rear ends of the compression springs 102 whereupon the springs 102 serve as shock absorber means to absorb the stopping shock of the skid member 70.

Figure 7:
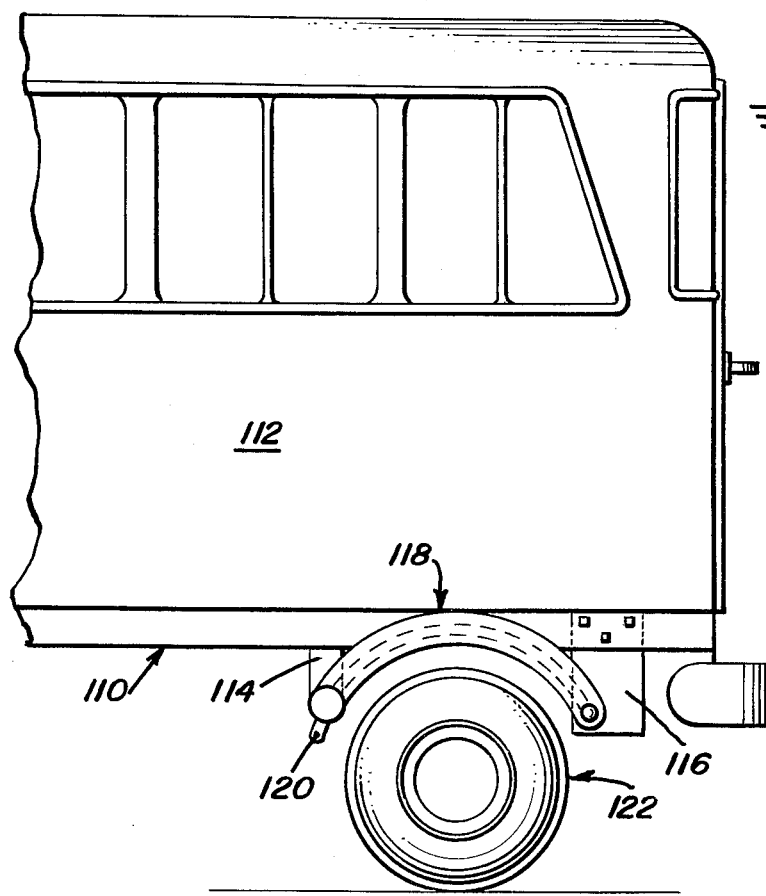
FIG. 7 is an elevational view of an arcuately shaped support tray as employed upon a bus.

The emergency brake of the present invention may be configured to accommodate either single or dual wheeled vehicles. As described thus far, the emergency brake has been configured for use with a dual wheeled vehicle having a plurality of axles. The skid is designed to extend beneath both wheels 16 and wheels 18 so as to provide maximum braking ability. As seen in FIG. 7, an emergency brake may also be configured for use with a vehicle having only one rear axle. In FIG. 7, a bus generally designated by the numeral 110 includes a body 112 to which are attached forward mounts 114 and the rear mounts 116. An arcuately shaped support tray 118 is pivotally attached to the rear mount 116 and is attached to the forward mount 114 by the use of solenoid as discussed with reference to support tray 34. Support tray 118 and the skid 120 disposed therein function in the same manner as support tray 34 and skid 70 previously discussed. The major distinction between these two embodiments of the invention is that support tray 118, being arcuately shaped, will present a larger surface area to wheel 122 when the support tray is forced into engagement with that wheel upon skid 120 becoming entrapped between the wheel and the support surface. In this manner, the stopping force felt by the skid 120 may be transferred partially to the wheel 122 as well as to the hinge connection of rear support element 116.

Figure 8:
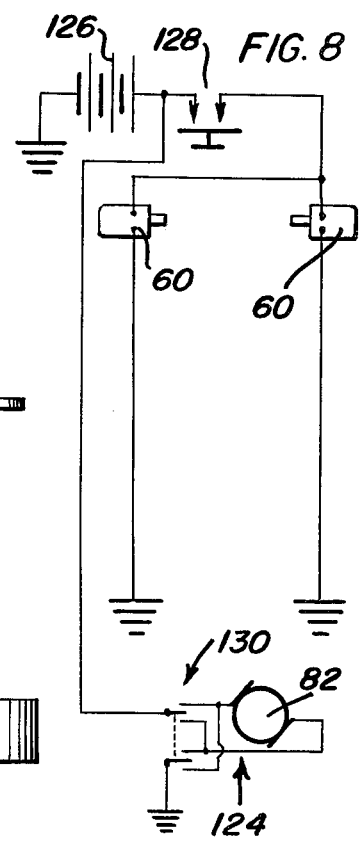
FIG. 8 is a schematic view of the circuit used to control the emergency brake.

Now with reference to FIG. 8, the circuit represented by numeral 124 will be described. Circuit 124 includes a battery 126, which may be the vehicle battery or may constitute a battery maintained exclusively for use with the circuit. Battery 126 is connected at one end to ground and at the other end connected through switch 128 to solenoids 60. Solenoids 60 are connected at their opposite ends to ground. Thus, it can be seen that by depressing switch 128, which is physically placed within the cab of the vehicle in a location easily accessible by the vehicle driver, the solenoids 60 will be activated thus allowing support tray 34 to assume its lowered position whereat it is supported by springs 68. Connected in parallel to switch 128 and solenoid 60 is switch 130, which is a double pole double throw switch also located within reach of the vehicle driver and is operative for placing motor 82 either in a forward or a reverse mode of operation for respectively extending skid 70 from the support tray under power or to reposition the skid back into said support tray 34 after the braking operation is completed and the vehicle is backed off the skid.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a vehicle having a body and a ground engaging support wheel:
    an emergency brake comprising an elongated support tray;
    means pivotally mounting said support tray at one end of said vehicle body for movement about a horizontal axis disposed above and rearwardly of said support wheel and extending transversely of said tray and vehicle. the free end of said tray being open, disposed forwardmost relative to said vehicle wheel and freely swingable between a raised position and a lowered forwardly downwardly inclined position with the undersurface of said tray being held proximate to but spaced above the upper periphery of said support wheel by a resilient tray support means which is attached between said vehicle body and said tray;
    an elongated flexible skid member freely longitudinally slidable on said tray between a retracted inoperative position disposed on said tray and an extended position having one end projecting outwardly of the free end of said tray; and
    motive power means including an electric motor having a shaft, a gear attached to said shaft, said motor being mounted on said tray adjacent to the free end thereof, said gear operatively engaging said elongated flexible skid member for maintaining said skid member in its inoperative retracted position and for causing powered movement of said skid member for forcing said skid member to assume its extended operative position upon actuation of said motive power means.

2. The combination of claim 1 and further including first and second coacting abutment means carried by said tray and skid respectively for limiting extension of said skid member outwardly of said one end of said tray and further including shock absorbing means disposed between said first and second coacting means.

3. The combination of claim 1 wherein said motor is connected in a circuit, said circuit including switch means for causing forward or reverse operation of said motor.

4. The combination of claim 3 and further wherein said skid means includes hardened projections extending laterally from said skid for engaging a support surface upon which said support wheels rest when said skid is in its extended, operative position.

5. The combination of claim 1 wherein said resilient tray support means includes a pair of coil springs attached between the free end of said tray and said vehicle body to insure that said tray is spaced above the periphery of said support wheel during the initial extension of said skid.

6. The combination of claim 5 and further wherein said tray includes upwardly directed opposite side flanges extending longitudinally therealong and further includes supporting brackets secured to said vehicle body and extending along and embracing the opposite side flanges of said tray, a pair of transversely aligned bores formed in said opposite side flanges adjacent their rear ends and a pair of pivot shafts supported from said flanges and extending transversely thereof, adjacent ends of said pivot pins being receivable through said bores and thereby forming the said means pivotally mounting said support tray at one end.

* * * * *